United States Patent [19]
McDougal

[11] 3,919,961
[45] Nov. 18, 1975

[54] AUTOPILOT SYSTEM
[76] Inventor: John A. McDougal, 2314 E. Court St., Flint, Mich. 48503
[22] Filed: Apr. 17, 1974
[21] Appl. No.: 461,520

[52] U.S. Cl. ............ 114/144 E; 235/150.2; 244/50; 318/588; 318/610; 318/647; 318/597; 318/599
[51] Int. Cl.² ............ B63H 25/24; G05B 11/28; G05B 11/42
[58] Field of Search ............ 114/144 R, 144 E; 180/79.1; 235/150.2, 151.11; 244/50, 77 E, 77 D, 77 F; 318/561, 588, 603, 604, 610, 621, 647, 584–586, 597, 599

[56] References Cited
UNITED STATES PATENTS

| | | | |
|---|---|---|---|
| 3,131,340 | 4/1964 | Johnson et al. | 318/584 X |
| 3,140,436 | 7/1964 | Hatch | 114/144 R X |
| 3,505,577 | 4/1970 | Hirokawa | 114/144 R X |
| 3,596,163 | 7/1971 | Barrett | 318/588 |
| 3,656,043 | 4/1972 | Kawada et al. | 235/150.2 X |

Primary Examiner—Duane A. Reger
Assistant Examiner—Stephen G. Kunin
Attorney, Agent, or Firm—Harness, Dickey & Pierce

[57] ABSTRACT

An autopilot system for use primarily in conjunction with marine craft. The system comprises heading error, heading rate, and feedback circuitry for producing signals which are algebraically summed and fed to two separate comparators. The comparators produce "steer left" and "steer right" output command signals when the output signal from the summing amplifier bears a predetermined relationship to a set of reference signals. The signals from the heading error, heading rate, and feedback circuits are scaled so that the heading rate circuit has the capability of overriding the other two circuit signals and causing saturation of the output of the summing amplifier resulting in continuous operation of the rudder motor when the rate of change in craft heading exceeds a given value. Apparatus is also provided for varying this given value. The feedback circuit is connected to both comparator outputs and comprises an integrator circuit which imposes pulse width modulation into the operation of the rudder motor in accordance with the direction and duration of previous rudder motor actuations.

36 Claims, 5 Drawing Figures

AUTOPILOT SYSTEM

BACKGROUND AND SUMMARY OF THE INVENTION

The present invention relates to closed loop servo-mechanisms generally, and, in particular, to a novel autopilot system which is a configuration especially useful for marine craft.

Generally speaking, marine autopilot systems presently available may be divided into two general classes. First, there are those which are quite complex and expensive and which deliver performance which might be rated satisfactory to good when they are maintained in good working order. The complexity and delicacy of many of the precision parts of these more expensive devices make maintaining them in operating condition a frequent and burdensome task, and they are often found to be in a malfunctioning or inoperative condition. The second class of systems, while of considerably simpler construction and lower cost, gives only marginally acceptable performance, most of them being incapable of handling steering of a small boat in a heavy seaway.

One of the basic reasons for this state of affairs is the complexity, cost, and precision required to produce a reliable yet sufficiently accurate and stable directional heading reference. Applicant's co-pending application titled "Magnetic Heading Reference" Ser. No. 416,741, filed Nov. 19, 1973, mentioned in more detail later, is directed at correction of this deficiency.

A second basic reason for the high cost and the resulting limited market for marine automatic pilots of good performance lies in the area of closed loop servo-mechanisms and more specifically regarding the control of direct current electric motors in such servomechanisms in response to error signals. It is well known in the art of servomechanisms that "on-off" control (sometimes called "bang-bang" control) of such motors is of maximum simplicity and reliability and may be produced at minimum cost. It is an object of this invention to disclose a novel pulse width modulation scheme suitable for improved control of electric motors and which may be arranged to deliver appropriate motor response to error signals. Pulse width modulation is not new (applicant's U.S. Pat. No. 3,088,538, "Vehicle Cruise Control System," as manufactured by General Motors Corporation, is an example of pulse width modulation control of a pneumatic servo motor). In addition to its simplicity of construction and low cost, the pulse width modulation scheme of this disclosure is outstanding in its versatility. This versatility is evident, not only in its anticipated capability to handle different servo applications, but also where a single servomechanism is required to handle wide variations in installations and in operating conditions. The latter has been proven in the disclosed automatic pilot implementation where large variables exist in boat design and operating conditions such as wind and sea state.

The illustrated embodiment is directed to a novel autopilot system which achieves significant improvements in performance using an "on-off" type actuating device. An autopilot system is taught which is significantly less expensive than other presentably available autopilot systems yet which possesses a control capability admirably suited for many potential autopilot applications, especially on marine craft, both large and small. One feature of an autopilot system according to the present invention is that a substantial degree of approximately proportional control is attained with an "on-off" type actuating device; another feature is that certain advantages of "variable sampling frequency" type servos are exhibited but without the costs normally associated with this type servo; a further feature is that the same electronics, with the possible exception of only certain component values, may be used for large classes of craft (for example, tiller-type sailboats and outboard or stern-drive runabouts) thereby permitting the use of a single basic modular control package for virtually all applications thereby to provide a significant manufacturing economy; a further feature is that the invention is relatively less complicated and less expensive than other presently available systems of comparable performance and, hence, can bring a reliable autopilot system within the reach of a larger number of the public.

Briefly, the present invention provides a novel autopilot system wherein a craft is steered in a desired command heading with the craft steering system being automatically adjusted to correct craft deviation from the desired command heading. The craft steering system is automatically controlled by a steering motor which operates to position the craft rudder. When the steering motor turns in one direction, the rudder is operated to steer the craft in one direction; and when the steering motor turns in the opposite direction, the rudder is operated to steer the craft in the other direction. The steering motor is switched on and off in each direction in accordance with steering command signals generated by the autopilot circuitry. One steering command signal causes the steering motor to rotate in one direction while another steering command signal causes the steering motor to rotate in the opposite direction. The steering command signals are generated by a closed loop servo system which includes an actuating control. An actuating control signal is applied as an input to the actuating control and the actuating control develops the steering command signals in accordance with the actuating control signal. The actuating control signal is derived, in part, from a heading error circuit which provides a heading error signal whose magnitude and polarity are indicative of the magnitude and direction of the difference between the desired command heading and the actual heading of the craft. A feedback circuit is operatively coupled with both steering command channels to provide a feedback signal which is subtracted from the heading error signal to provide the actuating control signal. The actuating control includes a first comparator circuit which compares the actuating control signal with a first reference signal and a second comparator circuit which compares the actuating control signal with a second reference signal. When the value of the actuating control signal is greater than the value of the first reference signal, the first comparator circuit provides a steering command signal through an associated steering command channel to operate the steering motor in a manner which is calculated to bring the craft back toward the desired command heading from one direction. Similarly, when the actuating control signal is less than the value of the second reference signal, the second comparator circuit provides a steering command signal via an associated steering command channel to cause the steering motor to steer the craft back toward the desired command heading from the opposite direction. The first and second comparator circuits each exhibits a hysteresis characteristic so that the corresponding steering command signal is maintained for a limited range of values of actuating control signal below and above, respectively, the corresponding value of the actuating control signal which caused the corresponding comparator circuit to generate initially the corresponding steering command signal. The closed loop servo also includes a novel feedback circuit which is operatively coupled with both steering command channels to provide a feedback signal in accordance with the steering command signals. Importantly, the feedback circuit includes a weighted memory integrator for integrating the steering command signals to, in effect, superimpose a pulse width or duty cycle modulation on the steering motor response to the heading error signal, taking in account the running history of the steering motor. The weighted memory integrator is a single capacitor, shunted by a bleed resistor, which is operatively coupled with both steering command channels and which is charged positively and negatively, respectively, in accordance with the respective steering commands. The bleed resistor regulates the duty cycle of the steering motor in accordance with the value of the actuating control signal. The system also includes a heading rate circuit which provides a signal indicative of the rate of change of the craft heading. This heading rate signal is algebraically summed with the heading error signal and the feedback signal; however, the heading rate signal is scaled in relation to the heading error signal and the feedback signal to allow the heading rate signal to override the heading error signal and the feedback signal when the rate of change of craft heading exceeds a predetermined value. Such scaling is especially useful in minimizing heading overshoot when the heading error is being too rapidly reduced.

Additional features and advantages of the invention, along with those enumerated above, will be seen in the ensuing description and claims which are to be taken in conjunction with the accompanying drawings.

BRIEF DESCRIPTION OF THE DRAWINGS

The drawings illustrate a preferred embodiment of the invention in accordance with the best mode presently contemplated for carrying out the invention.

DESCRIPTION OF THE PREFERRED EMBODIMENT

Figure 1:
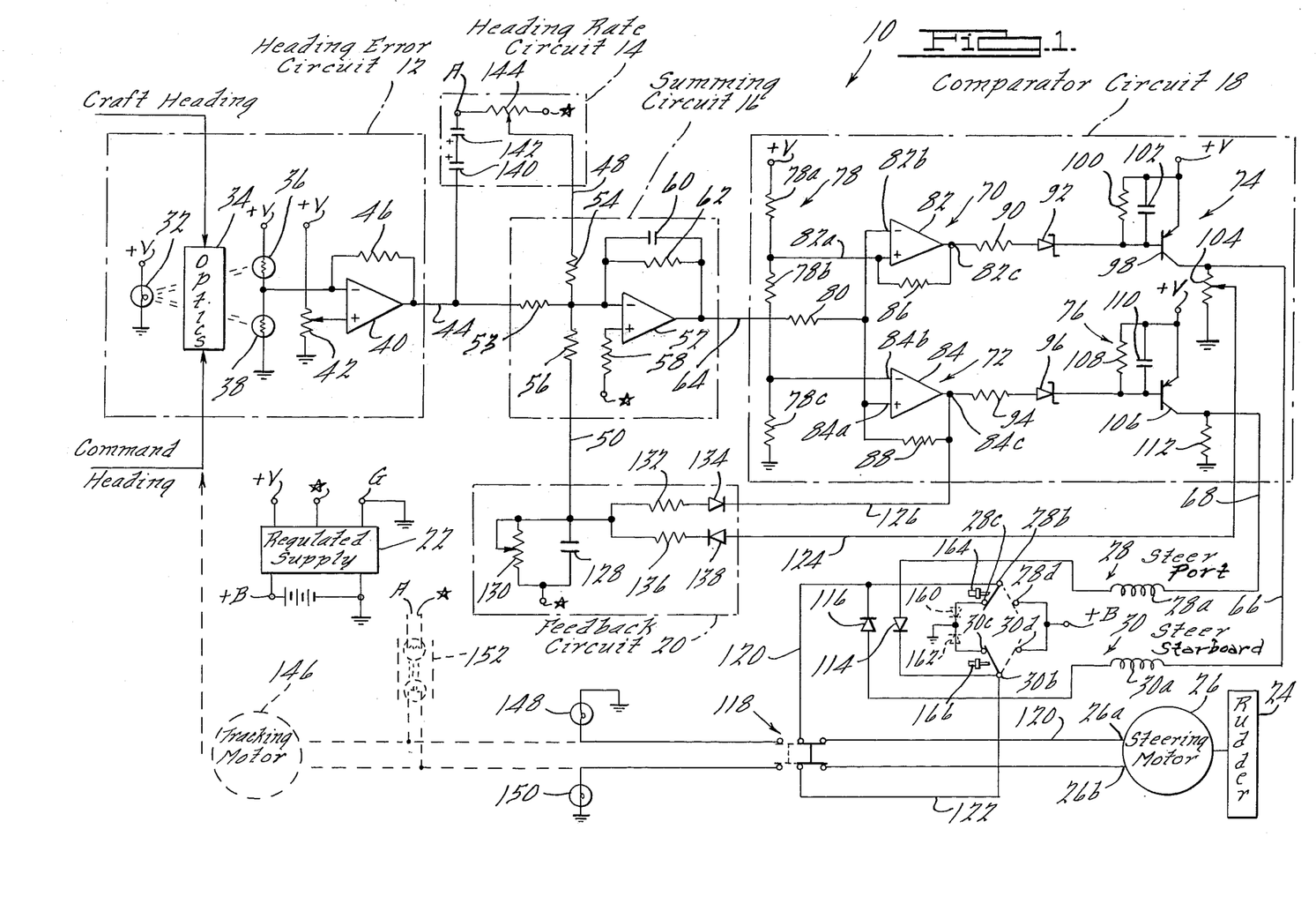
FIG. 1 is a schematic diagram of an autopilot system in accordance with principles of the present invention.

In FIG. 1, an autopilot system 10 according to the present invention comprises: a heading error circuit 12, a heading rate circuit 14, a summing circuit 16, a comparator circuit 18, a feedback circuit 20, and a regulated power supply 22. Autopilot system 10 automatically controls the rudder 24 of a craft to automatically steer the craft in a desired command heading. Rudder 24 is operatively coupled with a steering motor 26 which is preferably a permanent magnet direct current motor which is operated in a controlled manner, hereinafter described, to position rudder 24 in accordance with steering command signals developed by autopilot system 10. By way of example, steering motor 26 is operatively coupled with the craft rudder through appropriate coupling mechanism to cause the rudder to be moved in amounts determined by the running time of motor 26, although it will be appreciated that the present invention may be practiced with various other types of prime movers and various types of craft steering systems. As will be explained in greater detail hereinafter, motor 26 is operatively coupled through steering relays 28 and 30, respectively, with comparator circuit 18.

Regulated power supply 22 is illustratively shown as connected across an unregulated D.C. supply, such as the craft +B battery to provide two regulated supply voltages for the system electronics. These regulated voltages are designated "+V" and "star" and for the disclosed embodiment are respectively +8 volts and +4 volts relative to ground G. As will be seen, star potential represents a zero heading error condition, and craft deviation about the reference heading is reflected as deviation about star potential.

In order to perform its intended control function, autopilot system 10 requires as inputs a command heading signal representing the desired course heading which the craft is to take and an actual craft heading signal indicative of the actual craft heading. As shown in FIG. 1, these inputs are supplied to heading error circuit 12. Briefly, heading error circuit 12 develops a heading error signal at its output which is representative of the deviation of the actual craft heading from the desired command heading. The signal provides both a measurement of the magnitude of the deviation as well as the direction of the deviation away from the desired command heading.

Figure 2:
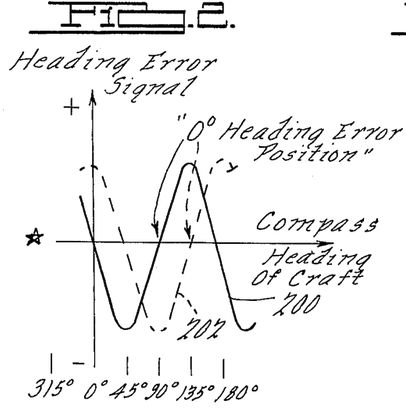
FIG. 2 is a first graph plot useful in explaining the operation of the autopilot system shown in FIG. 1.

Preferably, heading error circuit 12 is a device constructed in accordance with principles of applicant's earlier and co-pending U.S. Patent application Ser. No. 416,741 filed Nov. 19, 1973, entitled "Magnetic Heading Reference," and the disclosure of this earlier application is hereby incorporated in the present application by reference. According to principles of the invention disclosed in this earlier application, a heading error signal is developed by the magnetic heading reference device which is fixedly mounted on the craft. The magnetic heading reference device contains a source of unpolarized light which passes first through a polarizing disc and then an analyzing disc onto a pair of photocells. The polarizing disc is supported for rotation about a generally vertical axis, and a magnet is affixed to the polarizing disc so that the polarizing disc always aligns with the horizontal component of the prevailing external magnetic field. As light passes through the polarizing disc, it becomes polarized and the direction of polarization is thereby representative of the direction of the horizontal component of the prevailing external magnetic field. The analyzing disc has a central polarized region surrounded by an outer polarized region. These two regions of polarization have their respective directions of polarization at a 90° angle to each other. The polarized light which passes through the central polarized region is directed onto one photocell, and polarized light passing through the outer polarized region is directed onto the second photocell. When the polarized light has its direction of polarization at a 45° angle to the directions of polarization of the two regions of the analyzing disc, equal intensity light falls on the two photocells. This is called the "zero heading error position." The two photocells are connected in series with each other across a constant voltage source, and a signal is taken at the junction of the two photocells. As the heading of the craft changes, the direction of polarization of the polarized light relative to the analyzing disc changes. Hence, as the craft heading changes in one direction away from the "zero heading error position," the signal provided by the photocells increases; and when it changes in the other direction, the signal provided by the photocells decreases. The signal is amplified to provide an output characteristic such as that shown in FIG. 2. The graph plot 200 of FIG. 2 illustrates the output voltage of the heading error circuit 12 as a function of the relative angular displacement between the analyzing and polarizing discs. The abscissa of the graph plot represents compass heading of the craft, while the ordinate of the graph plot represents the magnitude of the output voltage on line 44. With the preferred magnetic heading reference, a high degree of accuracy can be attained without the need to use more complicated optical techniques and without the need to use more sophisticated electronic circuitry. Illustratively, changes in relative angular displacement between the analyzing and polarizing discs of less than 0.02° can be detected. Furthermore, the graph plot exhibits a sufficient degree of linearity about the "zero heading error position" that a linearizing system for the electronics to compensate for the approximately sinusoidal characteristic of the graph plot is totally unnecessary. The analyzing disc is positionable about an approximately vertical axis to thereby establish a "zero heading error position" at any desired compass heading around the full 360° range of compass headings and thereby set the command heading which is to be steered by the autopilot system. The graph plot 200 shows a "zero heading error position" to be coincident with the 90° compass heading. By way of example, the graph plot 202 shows a "zero heading error position" to be coincident with a 135° compass heading.

Hence, in FIG. 1, heading error circuit 12 is illustrated as having a lamp 32 which represents the source of unpolarized light of the magnetic heading reference; an optics system 34 which represents the polarizing and analyzing discs of the magnetic heading reference; a pair of photocells 36 and 38 which are connected in series with each other between +V and ground and which represent the photocells of the magnetic heading reference; an amplifier 40 having one input terminal thereof connected to the junction of photocells 36 and 38 and the other input terminal thereof connected to the wiper of a potentiometer 42. The output of amplifier 40 provides the heading error signal at line 44, and a feedback resistor 46 is connected from the output of amplifier 40 back to the negative input terminal of amplifier 40. Hence, once the desired command heading has been set by positioning the "zero heading error position" at the desired command heading, deviations of the actual craft heading from the selected command heading generate a heading error signal at line 44 with the heading error signal having a relationship to the craft heading as shown in FIG. 2. The shape of each of the illustrated graph plots in FIG. 2 shows that heading error circuit 12 exhibits a null at 90° intervals, a null being that value of output signal which occurs for equal intensity light falling on both photocells (i.e., "zero heading error position" producing a star potential output). Potentiometer 42 is adjusted at manufacture to provide equal excursions of the output signal about star potential and thereby develop the illustrated graph plots. One set pair of nulls consisting of nulls 180° apart will be a set of stable nulls, while the other set pair of nulls will be unstable. This is because the slope of graph plot at each stable null is of one polarity while the slope of the graph plot at each unstable null is of opposite polarity. While set pair of nulls is stable and which is unstable will depend upon the relative phasing of the downstream autopilot circuitry; for the illustrated embodiment the null shown at 90° and those at multiples of 180° therefrom represent stable nulls. In operation, the autopilot operates about one of the stable nulls; for example, the 90° null, and this represents the "zero heading error position." The heading error signal becomes less positive as the actual craft heading increasingly deviates toward port, while it becomes more positive as the actual heading increasingly deviates toward starboard. As will be seen from the ensuing description, autopilot system 10 operates to steer the craft toward starboard when the actual craft heading is too far port, and vice versa. In this way, the craft is automatically steered along the desired command heading.

The heading error signal is supplied via line 44 as the input to heading rate circuit 14 and as one input to summing circuit 16. The output of heading rate circuit 14 is supplied via a line 48 as a second input to summing circuit 16, while a feedback signal from feedback circuit 20 is supplied via line 50 as a third input to summing circuit 16. Summing circuit 16 comprises an operational amplifier 52 which is operatively connected in circuit to algebraically sum the heading error signal, the heading rate signal, and the feedback signal. However, prior to summation, the relative magnitudes of these three signals are scaled relative to each other by scaling resistors 53, 54, and 56, respectively, through which the respective signals are coupled to the negative input terminal of amplifier 52. The positive input terminal of amplifier 52 is connected through a resistor 58 to star, and the parallel combination of a capacitor 60 and a resistor 62 connects from the output terminal of amplifier 52 to the negative input terminal of amplifier 52. The output of amplifier 52 provides a summing circuit output signal from summing circuit 16 at line 64, and the magnitude of this signal, over the linear range of the operational amplifier, represents the magnitude of the algebraic summation of the three input signals thereto, but is of opposite polarity. This summing circuit output signal forms an actuator control signal for comparator circuit 18. Details of the relative scaling of the respective signals by the respective resistors 53, 54, and 56 will be explained later. Because the specifically disclosed embodiment of amplifier 52 provides an output signal whose polarity is opposite the polarity of its input signal, the output signal at line 64 becomes increasingly positive relative to star as the net input signal to amplifier 52 becomes increasingly negative relative to star, and vice versa.

Comparator circuit 18 provides respective steering command signals at respective output channels 66 and 68 in accordance with the value of the actuating control signal received via line 64 from summing circuit 16. Comparator circuit 18 comprises a first electronic comparator circuit 70, a second electronic comparator circuit 72, a driver stage 74 via which electronic comparator circuit 70 is operatively coupled with output channel 66; a driver stage 76 via which electronic comparator circuit 72 is operatively coupled with channel 68; and a reference circuit 78 via which reference signals are provided for comparator circuits 70, 72. Comparator circuit 18 further comprises a resistor 80 through which the actuating control signal is commonly supplied to both comparator circuits 70 and 72. Comparator circuit 70 includes an amplifier 82 having input terminals 82a, 82b and an output terminal 82c. Comparator circuit 72 includes an amplifier 84 having input terminals 84a, 84b, and an output terminal 84c. The two amplifiers 82 and 84 are identical, and the similarly suffixed terminals thereof correspond to each other. In other words, input terminals 82a and 84a represent the positive input terminals, while terminals 82b and 84b represent negative input terminals. Note that resistor 80 connects to the negative terminal 82b of amplifier 82 but to the positive terminal 84a of amplifier 84. Reference circuit 78 comprises three serially connected resistors 78a, 78b, and 78c which are connected in series between +V and G. The junction of resistors 78a and 78b is connected to the positive input terminal 82a of amplifier 82, while the junction of resistors 78b and 78c is connected to the negative input terminal 84b of amplifier 84. Importantly, each comparator circuit 70 and 72 includes a feedback resistor 86 and 88, respectively. Feedback resistor 86 connects between output terminal 82c and positive input terminal 82a, while resistor 88 connects between output terminal 84c and positive input terminal 84a. Thus, both amplifiers 82 and 84 are operated with positive feedback to produce hysteresis in their switching operation as will be explained more fully later. The relative values of resistors 78a, 78b, 78c are such that a first reference signal is supplied to positive input terminal 82a of amplifier 82, and a second reference signal is supplied to the negative input terminal 84b of amplifier 84. The potentials of these respective reference signals are slightly above and slightly below star potential and are graphically illustrated in FIG. 3. Amplifiers 82 and 84 each operates such that a saturated positive output signal relative to star is given at its output terminal if the signal at its positive input terminal is more positive than the signal at its negative input terminal, and each provides a saturated negative output signal if the signal at its negative input terminal is more positive than the signal at its positive input terminal. Hence, each comparator 70, 72 is essentially a switching device. The provision of feedback resistors 86 and 88 endows each comparator circuit 70 and 72 with a hysteresis characteristic with respect to the actuating control signal supplied to the comparator circuit 18 on line 64. This hysteresis is graphically shown in FIG. 3. Superficially, the effective switching characteristic as exhibited by comparator 70 causes its negative output signal to switch back to positive only when the input signal applied to its negative input terminal becomes less positive than the first reference signal by a predetermined amount $\Delta V1$. More precisely, when amplifier 82 exhibits a negative output, feedback resistor 86 lowers the voltage at the reference or positive input terminal of amplifier 82 by loading or drawing more current through reference circuit 78 thus requiring a more negative output signal from amplifier 52 to switch the output of amplifier 82 from negative to positive than was previously required to switch the output of amplifier 82 from positive to negative.

Figure 3:
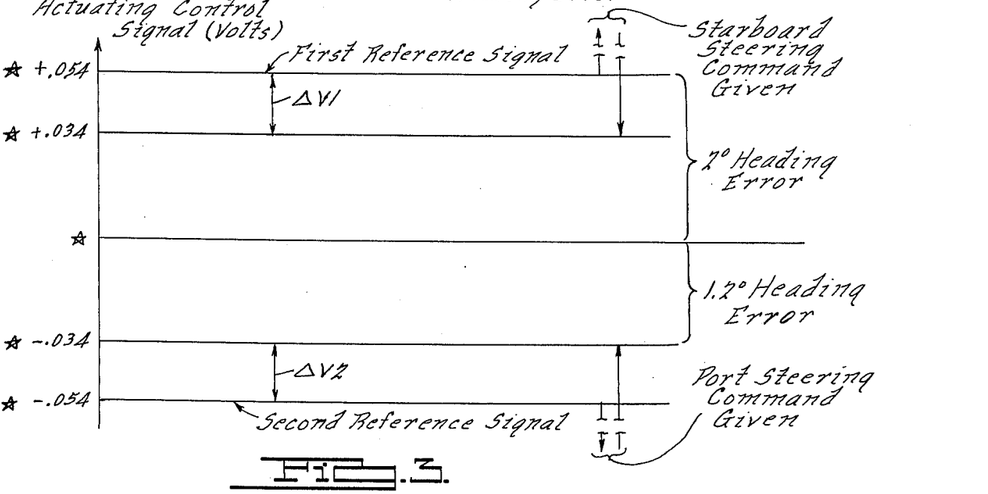
FIG. 3 is a second graph plot useful in explaining the operation of the autopilot system shown in FIG. 1.

Similarly, the hysteresis characteristic as exhibited by comparator 72 causes its negative output signal to switch back to positive only when the input signal applied to its positive input terminal becomes more positive than the value of the second reference signal by a predetermined amount $\Delta V2$. More precisely, when amplifier 84 exhibits a negative output (when the steer left channel is on), current through resistor 88 lowers the voltage at the positive input terminal of amplifier 84 by loading resistor 80 thus requiring a more positive signal from amplifier 52 to switch the output of amplifier 84 from negative to positive than was previously required to switch the output of amplifier 84 from positive to negative. In this way, comparator circuits 70, 72 define respective hysteresis bands $\Delta V1$ and $\Delta V2$ as shown in FIG. 3. By appropriate selection of resistors 78a, 78b, 78c, and 80 and resistors 86, 88, the hysteresis bands may be of substantially uniform width and substantially symmetrically located relative to star potential.

Driver stage 74 is operatively coupled with output terminal 82c of amplifier 82 via a serially connected resistor 90 and zener diode 92, while driver stage 76 is operatively coupled with output terminal 84c of amplifier 84 via a serially connected resistor 94 and zener diode 96. Driver stage 74 comprises a PNP transistor 98, a resistor 100, a capacitor 102, and a resistor 104, the latter being in the form of a potentiometer for supplying one feedback signal to feedback circuit 20 as will be hereinafter explained in greater detail. The emitter of transistor 98 is connected to +V while its collector is connected through resistor 104 to ground G. Resistor 100 and capacitor 102 connect in parallel with each other between the emitter and base of transistor 98. The base of transistor 98 connects to the cathode of zener diode 92. When the output signal at terminal 82c of amplifier 82 is saturated positive, the voltage at the anode of zener diode 92 is significantly less than +V and zener diode 92 is blocking and renders transistor 98 nonconducting thereby having a collector voltage of approximately ground potential. However, when the output signal at output terminal 82c of amplifier 82 is saturated negative, a sufficient reverse voltage is applied across zener diode 92 to cause it to operate in its zener region. Base current now flows in transistor 98 in an amount sufficient to switch transistor 98 into saturation. Accordingly, the collector voltage now rises to almost +V potential. When the output signal at terminal 82c of amplifier 82 switches back to its positive level, zener diode 92 is switched to its blocking condition thereby rendering transistor 98 nonconductive and causing the emitter voltage of transistor 98 to switch back to approximately ground potential. Hence, it will be appreciated that the output signal developed at channel 66 switches between ground and approximately +V potential in accordance with the value of the actuating control signal applied to comparator circuit 18 via line 64 with comparator circuit 70 imparting a hysteresis characteristic to provide the hysteresis band $\Delta V1$.

Driver stage 76 is identical to driver stage 74, comprising a PNP transistor 106, a resistor 108, a capacitor 110, and a resistor 112. Comparator circuit 18 provides an output signal at channel 68 which switches between +V potential and ground in accordance with the value of actuating control signal supplied to comparator circuit 18 via line 64 with comparator circuit 72 imparting a hysteresis characteristic to provide the hysteresis band $\Delta V2$.

Channels 66 and 68 are operatively coupled respectively with relays 30 and 28, respectively. Relay 28 comprises a coil 28a and a switchable contact 28b which is switched between fixed contacts 28c and 28d in accordance with energization of coil 28a. When coil 28a is not energized, movable contact 28b assumes the solid position shown in the drawing to engage fixed contact 28c; when coil 28a is energized, movable contact 28b assumes the broken line position to engage fixed contact 28d. Relay 30 is identical to relay 28 and comprises a coil 30a, a movable contact 30b which contacts a fixed contact 30c when coil 30a is not energized and which contacts another fixed contact 30d when coil 30a is energized. Manual push buttons 164 and 166 are arranged to permit manual momentary positioning of movable contacts 28b and 30b, respectively. Contacts 28c and 30c are connected to ground G, while contacts 28d and 30d are connected to the positive terminal of the +B supply. The terminal of coil 28a which is not connected to channel 68 connects through a diode 114 with movable contact 30b of relay 30, while the terminal of coil 30a which is not connected to channel 66 connects through a diode 116 to the movable contact 28b of relay 28. Thus, irrespective of the signals in the electronic circuits, manual push buttons 164 and 166 are arranged to mechanically actuate the relay movable contacts providing overriding manual control of steering motor 26.

The movable contacts of the two relays are respectively connected through a selector switch 118 with steering motor 26. Specifically, a line 120 connects from movable contact 28b through a normally closed set of contacts of switch 118 to one terminal 26a of steering motor 26 while line 122 connects from movable contact 30b through another normally closed set of contacts of switch 118 to another terminal 26b of motor 26. When coil 28a is energized from channel 68, contact 28b is switched to the broken line position thereby connecting the positive terminal of the +B supply through line 120 to terminal 26a of motor 26. Motor 26 now rotates in one direction to move rudder 24 in one direction. Likewise, when coil 30a is energized from channel 66, movable contact 30b is switched to its broken line position to connect the positive terminal of the +B supply through line 122 to terminal 26b of motor 26. Motor 26 now rotates in the opposite direction to similarly move rudder 24 in the opposite direction. In this way, steering commands supplied from comparator circuit 18 move rudder 24 to steer the craft in opposite directions.

It is important to note that, when neither movable contact 28b nor movable contact 30b is actuated and are in their normally closed positions in contact with stationary contacts 28c and 30c respectively, terminals 26a and 26b of steering motor 26 are connected together effectively short circuiting the armature circuit of the motor. Consider that the motor is running due to actuation of one or the other of channels 66 or 68 as previously described; kinetic energy is stored in the rotating armature and in the moving members of the mechanically connected load. When the aforesaid channel actuation ceases and the motor is short circuited through the normally closed relay contacts, the motor acts as a generator and the stored kinetic energy is dissipated by the short circuit current flowing in the armature circuit resistance. While this type of operation may be desirable in some types of servo operation where it is desired to bring the motor quickly to a stop (during the T off periods of FIG. 4), it results in heating of the motor armature circuit and is wasteful of power. To conserve power and to permit the motor to deliver energy to the load even when no current is being delivered to the motor (during the T off periods of FIG. 4), optional diodes 160 and 162 may be placed in series between stationary contacts 28c and 30c and their ground connections. These diodes block the short circuiting of the motor during the T off periods of FIG. 4 permitting it to coast and to deliver its kinetic energy to the load during said periods. Achieving this coasting type of operation is, of course, dependent on the period of the T on—T off cycle of FIG. 4 being short in comparison with the mechanical line constant of the motor and the coupled load. In the disclosed embodiment, the craft is steered to starboard when a command signal is supplied via channel 66 and the craft is steered to port when a command signal is supplied via channel 68. The steering commands supplied to the steering motor will be such that the heading error will always tend to be nulled out thereby causing the craft to follow the command heading. However, feedback circuit 20 supplies feedback information which optimizes the system performance and insures that heading error signals are eliminated with maximum dispatch.

Feedback circuit 20 is operatively coupled with comparator circuit 18 so that signals indicative of both starboard and port steering command signals are used to provide feedback information. In particular, feedback circuit 20 is operatively coupled via a line 124 with the wiper of potentiometer 104 to receive a signal indicative of the starboard steering command signal and also via a line 126 with output terminal 84c of amplifier 84 to receive a signal indicative of the port steering command signal. Importantly, feedback circuit 20 includes a weighted memory integrator provided by the parallel combination of a capacitor 128 and an adjustable bleed resistor, or potentiometer, 130 to supply the aforementioned feedback signal via line 50 to summing circuit 16. One terminal of this parallel combination connects to star potential while the other terminal connects directly to line 50 and also through the series combination of a resistor 132 and a diode 134 to line 126 and through the series combination of a resistor 136 and a diode 138 to line 124.

Resistor 130 tends to bleed charge from capacitor 128 so that capacitor 128 is normally uncharged (i.e., both terminals are at star potential) after the system has been inactive for a considerable time. However, when a starboard steering command is given, the potential supplied from the wiper of resistor 104 through diode 138 and resistor 136 tends to charge capacitor 128 such that the potential at line 50 becomes increasingly positive relative to star. Similarly, when a port steering command signal is given via channel 68, the negative signal given at output terminal 84c of amplifier 84 tends to charge capacitor 128 through resistor 132 and diode 134 to make the potential at line 50 increasingly negative relative to star. The phasing of the relative signals in the system is such that the feedback supplied by feedback circuit 20 is always degenerative feedback (i.e., negative feedback). Hence, for a heading error signal which generates a negative input signal to summing circuit 16 (and which is indicative of off-course heading toward port), a starboard steering command signal is given by comparator 18 which causes an increasingly positive signal to be developed by feedback circuit 20 at line 50 thereby subtracting from the effect of the heading error signal. Correspondingly, when an increasingly positive polarity heading error signal is supplied from heading error circuit 12 to summing circuit 16 (indicating an off-course heading toward starboard), the autopilot system provides a port steering command signal which causes capacitor 128 to be charged such that the potential at line 50 becomes less positive relative to star thereby subtracting from the effect of the heading error signal. By such operation, feedback circuit 20, in effect, superimposes a pulse width, or duty cycle, modulation on the effect of the heading error signal. As a result, a substantial degree of proportional control (actually, an exponential approximation of proportional control) is attained with the use of "on-off" type servo components as provided by steering relays 28 and 30 and steering motor 26. In addition to the feedback signal being such that it opposes further running of the steering motor in the same direction as it has recently been running, the complete running history of the steering motor is taken into account by the charge on capacitor 128. More recent running of the motor is exponentially weighted so as to exert a greater influence on the feedback signal than motor running which occurred in the more distant past.

Figure 4:
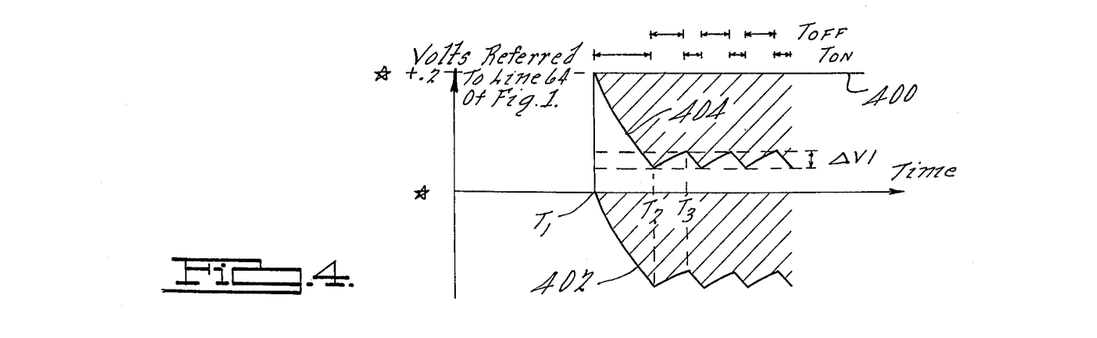
FIG. 4 is a third graph plot useful in explaining the operation of the autopilot system shown in FIG. 1.
Figure 5:
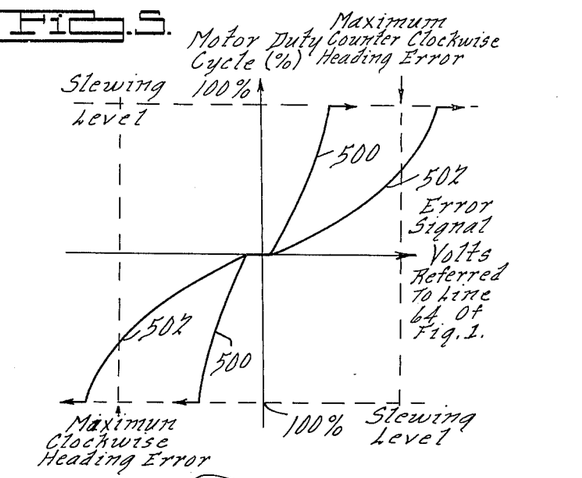
FIG. 5 is a fourth graph plot useful in explaining the operation of the autopilot system shown in FIG. 1.

Interaction between the feedback signal and the heading error signal and the effect of such interaction on the operation of comparator circuit 18 may be better understood by considering the graph plot shown in FIGS. 4 and 5. FIG. 4 illustrates the system open loop response to a negative step in the heading error signal appearing on line 44 with line 48 disconnected and with steering motor 26 disconnected from the rudder 24. The step indicates that the craft is heading to port of the command heading. The graph plot 400 in FIG. 4 illustrates a step in the heading error signal occurring at time $T_1$; the graph plot 402 illustrates the feedback signal supplied from feedback circuit 20 on line 50 in response to the step in the heading error signal; and the graph plot 404 illustrates the shape of the actuating control signal supplied from summing circuit 16 to comparator circuit 18 on line 64 in response to the step in the heading error signal. For convenience, the three graph plots 400, 402, and 404 are referred to the voltage at the output of summing circuit 16, and it will be appreciated that only graph plot 404 represents the actuating control signal actually supplied at the output of summing circuit 16. The shaded area below the abscissa is reproduced above the abscissa to graphically illustrate the subtraction of 402 from 400 which is accomplished by summing circuit 16 to yield plot 404. Prior to the step in the heading error signal, both the heading error signal and the feedback signal are at star potential thereby providing star input potential to summing circuit 16. Accordingly, the output signal of summing circuit 16 as shown by graph plot 404 is also at star potential. At time $T_1$, the step in the heading error signal occurs. The illustrated step causes the output signal of summing circuit 16 (i.e., the actuating control signal) to become 0.2 volt more positive than star. Since this signal now exceeds the first reference level of comparator circuit 18, the starboard steering command signal is given via channel 66. Accordingly, capacitor 128 becomes increasingly positively charged through diode 138 and resistor 136 tending to charge exponentially toward a maximum positive potential established by the setting of potentiometer 104. (It should be noted that potentiometer 104 is adjusted in manufacture to provide symmetry about star for the positive and negative values to which capacitor 128 is charged in response to the generation of the respective steering command signals.) However, since the actual step in the heading error signal which was applied to summing circuit 16 from heading error circuit 12 is of negative polarity, the increasingly positive polarity of the feedback signal in effect subtracts from the effect of the heading error signal. Hence, the output signal provided by summing circuit 16 to comparator circuit 18, i.e., graph plot 404, becomes less positive, having a value equal to the difference between graph plot 400 and graph plot 402. When capacitor 128 has accumulated sufficient positive charge that the output signal from summing circuit 16 drops below the lower limit of the hysteresis band $\Delta V1$, the steering command signal at channel 66 terminates. This occurs at time $T_2$. Since now neither steering command signal is being supplied to charge capacitor 128 either more positively or more negatively, the charge on capacitor 128 is dissipated through resistor 130. Hence, the difference between the feedback signal and the heading error signal increases to thereby similarly increase the output signal from summing circuit 16. When this output signal reaches a magnitude which exceeds the first reference signal, the steering command signal is again given by channel 66. This occurs at time $T_3$. The pattern continues indefinitely in this manner with the steering command signal being intermittently generated for on-time durations designated $T_{on}$ separated by off-time durations designated $T_{off}$. It will be noted that the first $T_{on}$ duration is significantly longer than the remaining $T_{on}$ durations which are of uniform duration. The operation of the autopilot system is analogous with respect to heading errors toward starboard. In response to such a step error, the port steering command signal is given and capacitor 128 is charged more negatively through resistor 132 and diode 134. The feedback signal subtracts from the heading error step, and the summing circuit output signal interacts with the hysteresis band of comparator 72 in a fashion analogous to that described above for comparator 70. In other words, the graph plots 400, 402, 404 will be the mirror images of those shown in FIG. 4.

The T on period is most conveniently adjusted by component values of capacitor 128 and resistors 132 and 136; and, as this RC time constant is made smaller, the T on period becomes of shorter duration. The T off period is best controlled in similar fashion by the value of capacitor 128 and the manual setting of potentiometer 130 in that larger values of resistance retain the negative feedback signal on capacitor 128 for longer periods thus inhibiting motor running by increasing the durations of the T off periods. By providing adjustment of resistor 130, the relative proportion of the on-time to the off-time may be set in accordance with the setting of resistor 130. Moreover, the setting of resistor 130 will determine the magnitude of heading error signal which will cause slewing operation of the system and if set to a sufficiently high resistance may completely inhibit slewing under the influence of the heading error signal. However, the heading rate circuit is accorded sufficient gain with maximum adjustment of potentiometer 144 to be able to produce slewing irrespective of the setting of potentiometer 130. Thus, heading error alone cannot produce slew on plot 502. Graph plot 500 in FIG. 5 shows the motor duty cycle as a function of the total error signal provided to summing circuit 16 as referred to the output of summing circuit 16 for a given setting of resistor 130, while graph plot 502 shows the same function for a different setting of resistor 130 at which resistor 130 provides a larger magnitude of resistance shunting capacitor 128. The reason that the motor duty cycle will vary with the magnitude of the total error signal is that capacitor 128 always charges toward a fixed, more positive value when the starboard steering command signal is given by channel 66 and toward a fixed negative value when the port steering command is given by channel 68. Hence, for a larger step in the total error signal, the graph plot 404 will intersect the hysteresis band at a much smaller angle whereby the duration of the motor on time will be increased. Similarly, the motor off time is determined substantially for the most part by the setting of resistor 130 which always discharges capacitor 128 toward star potential. Hence, for a larger step in total error, the off time segments of graph plot 404 will be selected from a steeper portion of the RC discharge curve and, thus, the off time periods are shorter for larger errors. Hence, the motor duty cycle will exhibit the characteristic shown in FIG. 5 for a given setting of resistor 130.

Assuming for the moment the absence of any heading rate signal from heading rate circuit 14, the overall operation of autopilot system 10 may now be explained. A desired command heading which the craft is to take is set by positioning the analyzing disc of the magnetic heading reference constituting heading error circuit 12 to thereby set the "zero heading error position" at the desired compass heading. So long as the craft maintains this command heading, steering motor 26 is not operated. However, during its voyage, the craft will normally experience deviations from the desired reference heading for any one or combination of different reasons. For example, the rudder position may not be perfectly true, and eventually will cause the craft to steer away from the desired reference heading by more than a predetermined amount; extraneous disturbances such as currents, wind gusts, etc., may tend to cause the craft to depart from its desired command heading by more than a given amount. By way of example, the difference between the first reference signal and the second reference signal provided for comparator circuit 18 may define a range of course headings of slightly more than 4°. Also by way of example, each hysteresis band may define a range of course headings of 0.8°. Hence, should the craft heading deviate more than approximately 2° from the desired reference heading, a steering command signal will be given by one of the command channels to operate motor 26 and position rudder 24 to bring the craft back to its desired heading. For example, if the craft heads more than approximately 2° toward port from the desired reference heading, the starboard steering command signal is given to steer the craft to starboard. The starboard steering command signal will be maintained only until the actuating control signal supplied to the comparator 70 has been reduced to the lower limit of its hysteresis band. Similarly, when the craft deviates more than 2° to starboard, the port steering command signal is given to steer the craft back toward the desired heading reference. The provision of the hysteresis bands by comparator circuit 18 minimizes fluctuation and possible oscillation which might otherwise arise if such hysteresis bands were absent, thereby providing system operation which accurately maintains the craft on the desired heading without excessive motor running.

When it is desired to change the command heading, analyzing disc of the magnetic heading reference may be repositioned to establish the "zero heading error position" at a new compass heading. In view of the particular shape of the output characteristic of heading error circuit 12 as shown in FIG. 2, it is desirable to limit the size of sudden changes of the analyzing disc position to less than 90° to thereby preclude too large a departure of the command heading from the actual craft heading at any time during the change of heading and thereby eliminate the chance of arriving at the wrong stable null position 180° from that intended. However, for relatively gross departure of the actual craft heading from the desired command heading about a null position, the autopilot system 10 exhibits a slewing capability whereby the steering motor is caused to continuously operate until the actuating control signal applied to comparator circuit 18 has been reduced below a predetermined value established by the appropriate hysteresis band. Thereafter, the steering motor is intermittently operated at increasingly spaced intervals for decreasing periods of time until the craft heading is brought into substantial correspondence with the command heading.

The effect of heading rate circuit 14 may now be considered. Essentially, heading rate circuit 14 differentiates the heading error signal to provide via line 48 a heading rate signal which is algebraically summed with the heading error signal and the feedback signal by summing circuit 16. For this purpose, heading rate circuit 14 comprises a capacitor 140, a capacitor 142, and a potentiometer 144 connected as illustrated between lines 44 and 48. One terminal of potentiometer 144 is connected to star, and when the potentiometer wiper is positioned to this terminal, heading rate 14 is effectively removed from circuit since summing circuit 16 only sums deviations of any of its input signals from star potential. However, setting is the wiper of potentiometer 144 is operated away from the terminal thereof which is connected to star potential, its rate effect on the autopilot system becomes increasingly signficiant. The purpose of this adjustment is to attain optimum system performance in both heavy as well as calm seas. Normally, more gain is required in heavy seas than in calmer seas. A correct adjustment setting is indicated when the response of the craft to a sudden change in command heading involves only one or two small overshoots. Instability or hunting may result if the gain of the heading rate circuit is too low, and, therefore, in normal operation of the autopilot system, the heading rate signal is accorded some effect. The effect of the heading rate circuit is especially important in minimizing overshoot, and the circuit operates such that the heading rate signal supplied via line 48 subtracts from the heading error signal supplied by line 44 when craft deviation from the desired heading is being reduced too rapidly.

Importantly, the gain of heading rate curcuit 14 may be adjusted via adjustment of potentiometer 144 to produce a saturated voltage output from summing circuit 16 even though the net effect of the heading error signal and the feedback signal may be such that entirely a contrary condition is indicated. This is done by the relative scaling of resistors 53, 54, and 56 whereby the effect of the heading rate signal on summing circuit 16 is much more pronounced for a given level of heading rate signal than are the heading error signal and the feedback signal. Due to this arrangement, overriding priority is given to stopping any changes in the craft heading which exceed the rate established by the setting of potentiometer 144. The heading error and feedback signals are very deliberately limited in maximum amplitude so that for all possible values of the algebraic summation of these two signals, as scaled by resistors 53 and 56, the output of summing circuit 16 varies over a limited portion of its linear range. For example, if the output of amplifier 52 has a 5-volt range, namely, an excursion of 2½ volts positive and 2½ volts negative about star, the heading error signal and the feedback signal are scaled so that each may contribute at most 1 volt each to the output of summing circuit 16. Hence, the maximum possible excursion of the output signal of summing circuit 16 is plus and minus 2 volts. This leaves a remaining dynamic range of at least 0.5volts in which the heading rate circuit can exert a modulating effect on the output of the summing amplifier. Further, if the error rate signal is not so limited (i.e., if its gain is high), the error rate signal is given overriding priority permitting it to bring to bear 100 percent rudder motor duty cycle for the object of limiting any changes in ship's heading which exceed the saturation rate determined by the adjustment setting of potentiometer 144. Further, the feedback circuit inexpensively introduces elements of the more sophisticated variable sampling frequency servos in that, when the heading error is small, the motor runs less frequently and for shorter periods but, when the error is large, the motor runs more frequently and for longer periods. Moreover, the system provides an important slewing capability by which the steering motor is continuously operated at maximum speed when the sum of the rate error signal and the heading error signal exceeds a predetermined value. For lesser error sums, the motor is operated intermittently to bring the craft heading to the desired command heading. In this way, the heading error is always reduced with maximum dispatch and with optimum response. Since resistor 130 has the effect of continuously discharging any charge on capacitor 128 towards star, it can be used to advantage to adjust the duty cycle of the steering motor over a given range. The graph shown in FIG. 4 illustrates the effect of adjusting the resistance of resistor 130 in shunt with capacitor 128. By decreasing the magnitude of resistance in shunt with capacitor 128, the average inhibiting effect of feedback circuit 20 is reduced to produce longer motor running periods and shorter motor off periods and larger rudder displacement for a given error. In view of this effect, resistor 130 may be thought of as increasing the effect of the heading error signal and may be provided on the craft for adjustment by the craft operator. By increasing the effect of this signal, the craft will stay closer to the desired reference heading at the expense of greater motor running until excessive rudder response to error is reached and hunting or unstable operation results.

A pair of indicator lamps 148, 150 are respectively connected to the respective terminals of switch 118 for "manual mode" operation and may be used when the tracking motor option is not installed to manually set the magnetic heading reference optics to correspond to the ship's heading prior to engaging the steering motor. When both lamps are extinguished, the magnetic heading reference is at one of its nulls. If the analyzing disc is now rotated in the direction to change course to the right, lamp 150 should light signifying that the steer right channel 66 has been activated thus indicating a stable null. With the magnetic heading reference so adjusted, switch 118 may be moved to the automatic position (solid line position), and the autopilot now steers the ship automatically.

The invention is also well suited for a tracking motor option which automatically synchronizes the magnetic heading reference with the prevailing craft heading while the craft is being manually steered. Specifically, a tracking motor 146 automatically adjusts the analyzing disc of optics system 34 of heading error circuit 12 so that the stored command heading always corresponds to the actual craft heading. For this purpose, tracking motor 146 is arranged to be energized by substantially the same electronic circuit which normally operates the steering motor when switch 118 is operated to a "standby mode" position shown in broken lines in FIG. 1. In its broken line position, switch 118 connects line 120 with one terminal of tracking motor 146 and connects line 122 with the other terminal of tracking motor 146. When a port steering command signal is given, tracking motor 146 rotates the analyzing disc in the appropriate direction, and when a starboard steering command signal is given, tracking motor 146 rotates the analyzing disc in the opposite direction. A photo-mod component 152 is connected to automatically modify the heading rate signal during operation of the lightly loaded tracking motor 146. The tracking motor option permits mounting of the magnetic heading reference and electronic package remotely from steering motor 26 and relays 28 and 30. The electronics package can thereby be mounted below deck out of the weather, and the magnetic heading reference can be located in a more stable position ideally at, or near, the roll and pitch axes of the craft. Further, less equipment is required near the steering station which is usually crowded.

It will be appreciated that specific design details may be executed by skilled persons using known techniques. By way of example, the following component values illustrate specifically the best mode presently contemplated for carrying out the preferred embodiment.

| | |
|---|---|
| Amplifiers 40 and 52 | Model 741 |
| Potentiometers 42 and 104 and resistor 112 | 10 kilohms |
| Resistor 46 | 15 kilohms |
| Resistor 53 | 3.9 megohms |
| Resistor 54 | 100 kilohms |
| Resistor 56 | 2.2 megohms |
| Resistor 58 | 680 kilohms |
| Capacitor 60 | .1 microfarads |
| Resistors 62 and 130 | 1 megohm |
| Resistors 78a, 78c, and 80 | 2.2 kilohms |
| Resistor 78b | 60 ohms |
| Amplifiers 82 and 84 | Model 1456 |
| Resistor 86 | 150 kilohms |
| Resistor 88 | 330 kilohms |
| Resistors 90 and 94 | 1300 ohms |
| Zener diodes 92 and 96 | 3.9 volts |
| Resistors 100, 108 | 56 kilohms |
| Capacitors 102, 110 | 10 microfarads |
| Transistors 98 and 106 | Model 2N5087 |
| Diodes 114, 116, 134, and 138 | Model 1N3064 |
| Capacitor 128 | .47 microfarads |
| Resistors 132, 136 | 39 kilohms |
| Capacitors 140, 142 | 22 microfarads |
| Potentiometer 144 | 160 kilohms |

While it will be apparent that the preferred embodiment of the invention disclosed is well calculated to fulfill the objects above stated, it will be appreciated that the invention is susceptible to modification, variation, and change without departing from the spirit thereof.

What is claimed is:

1. An autopilot system for a craft having a steering system including a prime moving means which is selectively operative to steer the craft in one direction in response to a first steering command signal and in an opposite direction in response to a second steering command signal, said autopilot system comprising: directional error means for developing a direction error signal representative of deviation of the actual craft direction from a desired command direction; comparator means including a first output command channel for supplying said first steering command signal and a second output command channel for supplying said second steering command signal; feedback means operatively coupled with both output command channels for supplying a feedback signal representative of said steering command signals; summing means operatively coupled with said direction error means and said feedback means for supplying a summing means output signal representative of the algebraic summation of said feedback signal and said direction error signal; said comparator means further including a first comparator operatively coupled with said summing means and said first command channel for comparing said summing means output signal with a first reference signal and for supplying said first steering command signal to said first output command channel when the value of said summing means output signal exceeds the value of said first reference signal and for maintaining said first steering command signal so long as the value of said summing means output signal exceeds a lower limit having a value less than the value of said first reference signal; said comparator means further including a second comparator means operatively coupled with said summing means and said second output command channel for comparing said summing means output signal with a second reference signal and for supplying said second steering command signal to said second command channel when the value of said summing means output signal is less than the value of said second reference signal and for maintaining said second steering command signal so long as the value of said summing means output signal is less than an upper limit having a value greater than the value of said reference signal; said feedback means further including pulse width modulation means for modulating said steering command signals by generating said feedback signal as a function of said first steering command signal when said first steering command signal is supplied to said first output command channel such that said feedback signal opposes increases in said summing means output signal above said lower limit value, and by generating said feedback signal as a function of said second steering command signal when said second steering command signal is supplied to said second output command channel such that said feedback signal opposes decreases in said summing means output signal below said upper limit value.

2. An autopilot system as claimed in claim 1 wherein said comparator means includes means for providing said first and second reference signals of equal magnitude respectively but of opposite polarity respectively relative to a system reference signal.

3. An autopilot system as claimed in claim 2 wherein said first comparator provides a given range between the value of said first reference signal and the value of said lower limit and said second comparator provides a range between the value of said second reference signal and the value of said upper limit which is equal in magnitude to the magnitude of said given range.

4. An autopilot system as claimed in claim 1 wherein said feedback means comprises a circuit element operatively coupled in common with both said output command channels and said summing circuit means.

5. An autopilot system as claimed in claim 1 further including direction rate means for providing a direction rate signal representing the rate of change of the craft direction and means for supplying said direction rate signal to said summing means for algebraic summation with said heading error signal and said feedback signal.

6. An autopilot system as claimed in claim 5 wherein said direction rate means includes selectable scaling means for relatively selectably scaling said direction rate signal relative to said direction error signal and said feedback signal.

7. An autopilot system as claimed in claim 5 further including scaling means for relatively scaling said direction rate signal relative to said direction error signal and said feedback signal such that in response to any rate of change in the actual craft direction exceeding a given value said direction error rate signal overrides said feedback signal and said direction error signal to exclusively control said summing means output signal.

8. An autopilot system as claimed in claim 1 including a common connection from said summing means to both said first and second comparators via which common connection said summing circuit means output signal is supplied to said first and second comparator circuits.

9. An autopilot system for a craft having a steering system including a prime moving means which is selectively operative to steer the craft in one direction in response to a first steering command signal and in an opposite direction in response to a second steering command signal, said autopilot system comprising: direction error means for developing a direction error signal representative of deviation of the actual craft direction from a desired command direction; control means including a first output command channel for supplying said first steering command signal and a second output command channel for supplying said second steering command signal; feedback means operatively coupled with both output command channels for supplying a single feedback signal in response to each steering command signal supplied to said output command channels which is representative of the duration of said steering command signals and the direction in which the craft is being steered; summing means operatively coupled with said direction error means, said feedback means, and said control means for supplying to said control means a summing means output signal representative of the algebraic summation of said feedback signal and said direction error signal; said control means including means for supplying said first steering command signal to said first output command channel and said second steering command signal to said second output command channel in accordance with said summing means output signal; said feedback means including a circuit element commonly connected to both command channels and to said summing means for developing said single feedback signal and supplying the same to said summing means.

10. An autopilot system as claimed in claim 9 wherein said feedback is degenerative.

11. An autopilot system as claimed in claim 9 wherein said circuit element is a capacitor.

12. An autopilot system as claimed in claim 11 wherein said feedback means includes means for causing current flow into one terminal of said capacitor in response to one steering command signal and causing current flow from said one terminal of said capacitor in response to the other steering command signal.

13. An autopilot system as claimed in claim 12 wherein said control means includes means for supplying said first steering command signal as a signal of one polarity and means for supplying said steering command signal also as a signal of said one polarity.

14. An autopilot system as claimed in claim 11 including bleed circuit means for bleeding charge from said capacitor.

15. An autopilot system as claimed in claim 14 wherein said bleed circuit means includes means for varying the rate at which charge is bled from said capacitor.

16. An autopilot system as claimed in claim 15 wherein said means for varying the rate of discharge of said capacitor comprises a variable resistor.

17. An autopilot system for a craft having a steering system including a prime moving means which is selectively operative to steer the craft in one direction in response to a first steering command signal and in an opposite direction in response to a second steering command signal, said autopilot system comprising: direction error means for developing a direction error signal representative of deviation of the actual craft heading from a desired command heading; control means including a first output command channel for supplying said first steering command signal and a second output command channel for supplying said second steering command signal; feedback means operatively coupled with both output command channels for supplying a single feedback signal in response to each steering command signal supplied to said output command channels which is representative of the time integral of said steering command signals; summing means operatively coupled with said direction error means, said feedback means, and said control means for supplying to said control means a summing means output signal representative of the algebraic summation of said feedback signal and said direction error signal; said control means including means for supplying said first steering command signal to said first output command channel and said second steering command signal to said second output command channel in accordance with said summing means output signal; said feedback means including means for feeding back a signal of one polarity relative to a reference potential when said first command signal is supplied by said first command channel, means for feeding back a signal of opposite polarity relative to said reference potential when said second command signal is supplied by said second command channel, and means for developing said single feedback signal from said one polarity and said opposite polarity signals.

18. An autopilot system as claimed in claim 17 wherein said feedback means includes a capacitor to which said one polarity and said opposite polarity signals are fed back.

19. An autopilot system as claimed in claim 18 wherein said capacitor is operatively coupled through one diode to said first command channel and through another diode to said second command channel.

20. An autopilot system as claimed in claim 17 wherein said control means includes means for generating said first steering command signal as a signal of a given polarity and means for generating said second steering command signal as a signal also of said given polarity.

21. An autopilot system as claimed in claim 20 wherein said control means includes inverting means operatively associated with one of said command channels for supplying as said one polarity signal a signal which is the inverse of the steering signal supplied by said one command channel, said opposite polarity signal being supplied by the steering signal supplied by said other command channel.

22. An autopilot system for a craft having a steering system including a prime moving means which is operative to steer the craft toward a desired command direction in response to a steering command signal, said autopilot system comprising: heading error means for developing a direction error signal representative of deviation of the actual craft direction from said desired command direction; control means including an output command channel via which said steering command signal is generated; direction rate means for supplying a direction rate signal representing the rate of change of the craft direction; feedback means operatively coupled with said output command channel for supplying a feedback signal representative of said steering command signal; summing means operatively coupled with said direction error means, said direction rate means and said feedback means for providing a summing means output signal representative of the algebraic summation of said feedback signal, said direction rate signal, and said direction error signal; scaling means for relatively scaling said feedback signal, said direction rate signal, and said direction error signal such that in response to any increase in said direction rate signal exceeding a given value, said control means continuously generates said steering command signal until said summing means output signal drops below a predetermined value and thereafter said control means generates said steering command signal intermittently for progressively decreasing durations at progressively increasing intervals until the actual craft direction substantially corresponds with said desired command heading.

23. An autopilot system claimed in claim 22 wherein said control means comprises a comparator which generates said steering command signal for controlled durations at controlled intervals so long as the value of said summing means output signal is greater than a reference value but is less than said predetermined value.

24. An autopilot system as claimed in claim 23 wherein said feedback means includes a capacitor for supplying said feedback signal, the charge on said capacitor varying in accordance with the duration of said steering command signal.

25. An autopilot system as claimed in claim 24 wherein said feedback means comprises means for charging said capacitor when said steering command signal is given and means for discharging said capacitor when said steering command signal is not given.

26. An autopilot system as claimed in claim 22 wherein said direction rate means includes means for selectably scaling said direction rate signal relative to said direction error signal and said feedback signal.

27. An autopilot system as claimed in claim 22 wherein said direction rate circuit means is operatively coupled with said direction error circuit means to derive said direction rate signal from said direction error signal.

28. An autopilot system as claimed in claim 22 wherein said direction rate means includes means for selectably controlling the rate at which changes in the craft direction must occur before said direction rate signal will exceed said given value.

29. An autopilot system as claimed in claim 28 wherein said selectably controlling means comprises a variable resistor for adjusting the gain of said direction rate signal.

30. An autopilot system for a craft having a steering system including a prime moving means which is operative to steer the craft toward a desired command direction in response to a steering command signal, said autopilot system comprising: direction error means for developing a direction error signal representative of deviation of the actual craft heading from said desired command direction; direction rate means for providing a direction rate signal representing the rate of change of the craft direction toward said desired command direction; control means comprising an output command channel via which said steering command signal is given, said control means generating said steering command signal when the value of a control signal exceeds a predetermined reference; feedback means operatively coupled with said output command channel for supplying a feedback signal representative of said steering command signal; summing means operatively coupled with said direction error means, said direction rate means, and said feedback means for algebraically summing said direction error signal, said direction rate signal, and said feedback signal to provide a resultant signal; amplifying means for amplifying said resultant signal over a range of values thereof to generate values of said control signal over a range of values thereof corresponding to said range of values of said resultant signal; and scaling means for relatively scaling said direction error signal, said direction rate signal, and said feedback signal such that said direction error signal and said feedback signal alone are, at most, capable of contributing to said resultant signal a value thereof within a limited portion of said range of values thereof and thereby producing a value of said control signal within only a limited portion of said range of values thereof, and such that said direction rate signal, when exceeding a value indicative of a predetermined rate of change of heading, is always capable of contributing to said resultant signal a value thereof sufficient to produce a value of said control signal at one limit of said range thereof.

31. An autopilot system as claimed in claim 30 wherein said direction rate signal, when exceeding said value indicative of a predetermined rate of change of direction, is always capable of contributing to said resultant signal a value thereof sufficient, when said direction error signal and said feedback signal are producing a value of said control singal at one limit of said limited portion of said range of values thereof, to override said heading error signal and said feedback signal and produce a value of said control signal at the limit of said range thereof which is more distant from said one limit of said limited portion of said range of values thereof than is the other limit of said limited portion of said range of values thereof.

32. In a closed loop feedback device which includes means for developing an error signal indicative of the direction and magnitude of the actual value of a controlled scalar quantity relative to a desired command value of said controlled scalar quantity, output means capable of bi-directionally adjusting the actual value of said controlled scalar quantity, said output means having a first input channel for commanding adjustment in a first direction and a second input channel for commanding adjustment in a second direction, a pulse width modulating generating loop means comprising charging time constant means connected to said first and second input channels for changing the stored energy in an energy storage means in a first direction in accordance with the duration of a signal traversing said first channel and for changing the stored energy in said energy storage means in a second direction in accordance with the duration of a signal traversing said second channel, said charging time constant means including means for bringing said energy storage means to a quiescent energy level corresponding to a value of said error signal indicative of substantial correspondence between the actual and command values of said controlled scalar quantity, summing means for degeneratively summing a measure of the level of stored energy in said energy storage means with said error signal for producing an actuating control signal, first comparator means for activating said first input channel of said output means when said actuating control signal exceeds a first reference level to provide said first channel signal and second comparator means for activating said second input channel of said output means when said actuating control signal falls below a second reference level to provide said second channel signal, said second reference level being less than said first reference level.

33. In a closed loop feedback device as claimed in claim 32, first hysteresis means for providing a first hysteresis band characteristic having an upper limit coincident with said first reference level and a lower limit below said first reference level, said first hysteresis means providing means for maintaining said first channel signal so long as said actuating control signal remains above said lower limit and second hysteresis means for providing a second hysteresis band characteristic having a lower limit coincident with said second reference level and an upper limit above said second reference level, said second hysteresis means providing means for maintaining said second channel signal so long as said actuating control signal remains below said upper limit of said second hysteresis means.

34. In a closed loop feedback device as claimed in claim 32, said energy storing means comprising capacitor means.

35. In a closed loop feedback device as claimed in claim 32, said means for bringing said energy storage means to a quiescent energy level being continuously operational.

36. In a closed loop feedback device as claimed in claim 35, said charging time constant means further including means for varying the rate at which said energy storage means is continuously being brought to said quiescent energy level.

* * * * *

UNITED STATES PATENT AND TRADEMARK OFFICE
CERTIFICATE OF CORRECTION

PATENT NO. : 3,919,961
DATED : November 18, 1975
INVENTOR(S) : JOHN A. McDOUGAL

It is certified that error appears in the above-identified patent and that said Letters Patent are hereby corrected as shown below:

Column 6, line 5, "While" should be --Which--.

Column 10, line 8, "line" should be --time--.

Column 14, line 31, after "However", change "setting is" to --when--.

Column 14, line 38, "settingis" should be --setting is--.

Column 17, line 38, (Claim 1, line 43), before "reference" insert --second--.

Column 19, line 4, (Claim 13, line 4), before "steering" insert --second--.

Signed and Sealed this fourth Day of May 1976

[SEAL]

Attest:

RUTH C. MASON
Attesting Officer

C. MARSHALL DANN
Commissioner of Patents and Trademarks